Feb. 15, 1966     R. H. CUTTY     3,235,070
CORRUGATED WRAP FOR AUTOMOBILE FENDERS
Filed Feb. 12, 1962     2 Sheets-Sheet 1
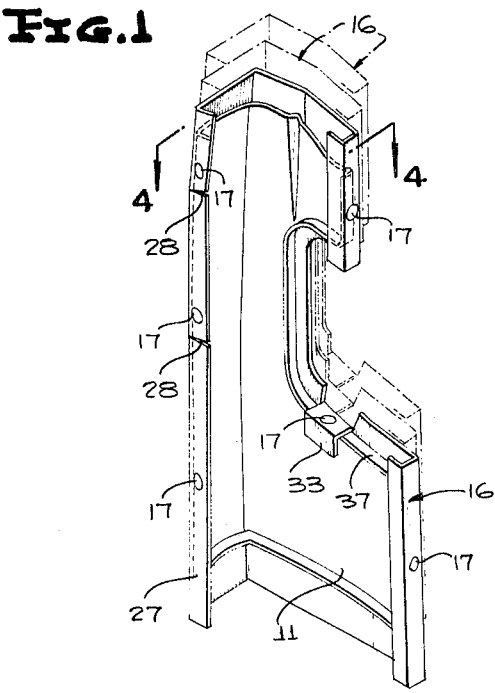
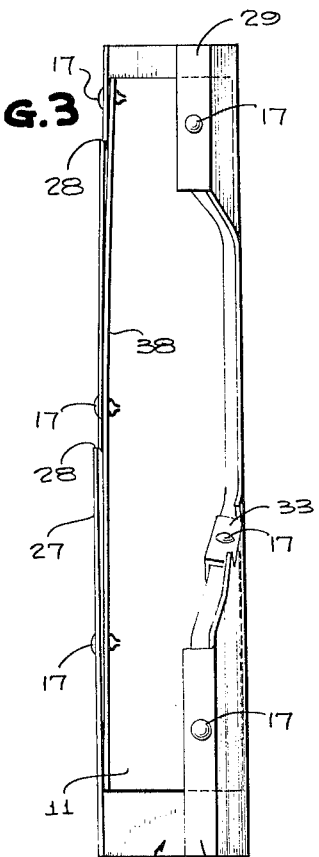
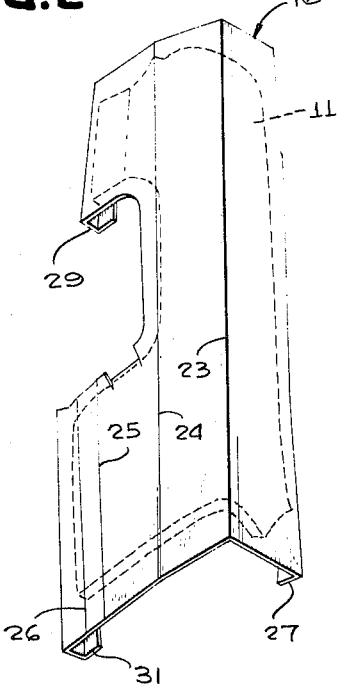
INVENTOR
ROBERT H CUTTY
BY
Mason, Porter, Diller & Stewart
ATTORNEYS Feb. 15, 1966           R. H. CUTTY           3,235,070
CORRUGATED WRAP FOR AUTOMOBILE FENDERS
Filed Feb. 12, 1962           2 Sheets-Sheet 2
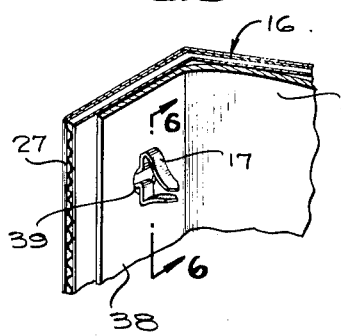
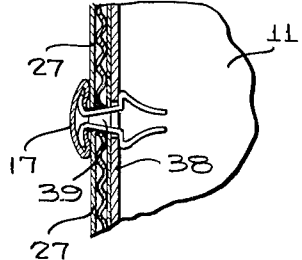
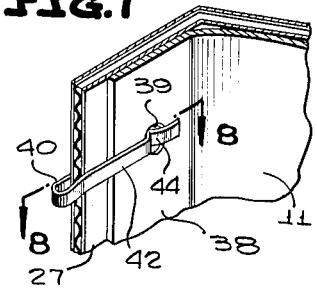
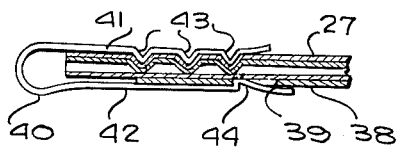
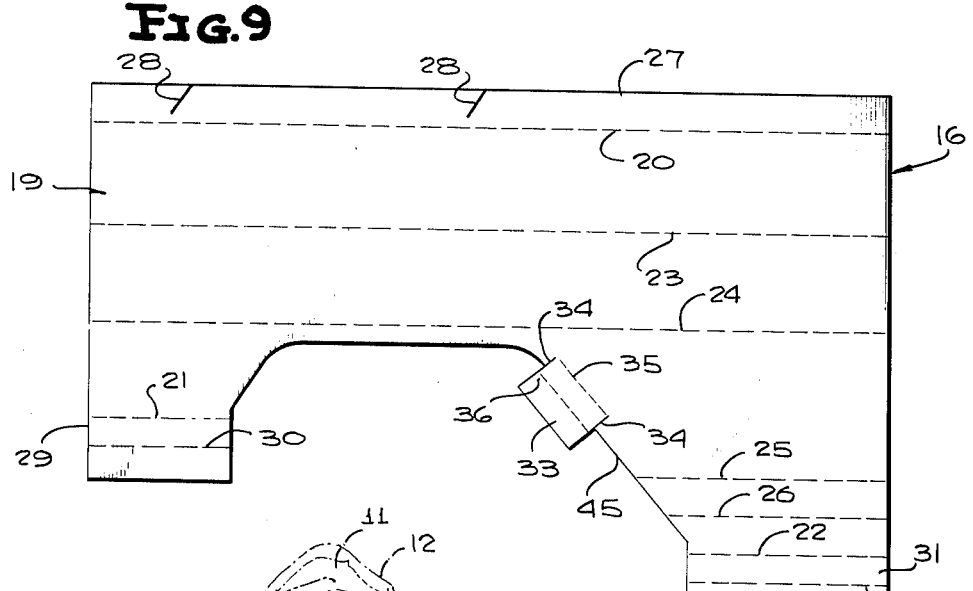
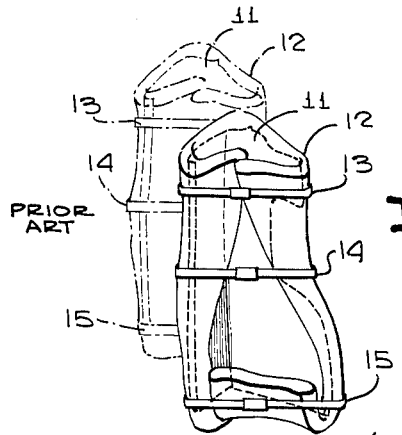
INVENTOR
ROBERT H CUTTY
BY
ATTORNEYS

United States Patent Office 3,235,070
Patented Feb. 15, 1966

3,235,070
CORRUGATED WRAP FOR AUTOMOBILE FENDERS
Robert H. Cutty, Detroit, Mich., assignor to Continental Can Company, Inc., New York, N.Y., a corporation of New York
Filed Feb. 12, 1962, Ser. No. 172,654
17 Claims. (Cl. 206—65)

This invention relates in general to new and useful improvements in the field of packaging articles for shipment and storage, and more particularly relates to a novel wrap or protective covering for automobile fenders.

At the present time individual automobile fenders have a protective paper-type covering which is wrapped thereabout and which is retained in place by a plurality of metal straps which extend around the fender generally normal to the axis thereof. Although the protective coverings provided for the fenders will amply protect the fenders, an undesirable amount of time is required to place the protective coverings on the fenders. Still more important is the fact that normally the fenders are shipped in large quantities, particularly when they are shipped for a long distance. Due to the fact that at the present time the protective coverings for fenders are held in place by encircling metal strips, the fenders cannot be nested, and therefore, the number of fenders which will occupy a given storage area is undesirably small.

In view of the foregoing, it is the primary object of this invention to provide a novel protective covering for automobile fenders which closely engages the automobile fenders and which corresponds substantially to the configuration of the automobile fenders whereby the fenders, with the covering attached thereto, occupy only slightly greater space than the fenders per se with the result that the protectively wrapped fenders may be readily nested to occupy a minimum of space for storage and shipment.

Another object of this invention is to provide an extremely inexpensive protective covering for use in packaging automobile fenders and other light weight sheet formed components, the protective covering being in the form of a paperboard product having a shape to be wrapped about the surface of the fender or the components to be protected, and each of the coverings being provided with edge portions adapted to overlie flanges of the components receiving bolt holes whereby spring clips may be passed through the edge portions of the coverings and through the bolt holes to releasably retain the coverings in place without requiring the customary use of encircling straps.

Still another object of this invention is to provide a novel protective covering adaptable in general for protecting a surface of sheet material components and more particularly automobile fenders, the covering extending beyond at least one end of the automobile fender and being of sufficient rigidity to function as a support whereby the covered automobile fender may be supported in an upstanding position notwithstanding the fact that the end of the fender is not cut straight across and with the entire supporting action being accomplished by the protective covering so as to prevent any damage of the fender by engagement with the supporting surface.

A further object of this invention is to provide a novel method of protectively wrapping light weight components formed of sheet material, such as fenders, the method of protectively wrapping the components or fenders including the provision of a suitable paperboard covering, wrapping the covering around the surface of the fender to be protected, and then securing edge portions of the covering to edge portions of the fender by means of removable clips or like fasteners.

Still another object of this invention is to provide a novel package including a fender having a surface to be protected, a paperboard cover wrapped around and protecting the surface of the fender, and suitable clips engaged over the edges of the cover and the fender releasably retaining the cover in place.

A still further object of this invention is to provide a novel protective cover for use in conjunction with a fender of an automobile for protecting a surface of the fender during shipment and storage, the protective cover being formed of corrugated board with the corrugations extending transversely thereof, the protective cover having a main portion with an outline corresponding to the developed outline of the surface to be protected and edge portions, the edge portions being connected to the main portion along longitudinal fold lines and being readily foldable for engagement around a fender to be wrapped, and the protective cover being further provided with other longitudinal fold lines for effecting a slight folding of the main portion thereof to conform to the contour of the fender surface to be protected.

With the above, and other objects in view that will hereinafter appear, the nature of the invention will be more clearly understood by reference to the following detailed description, the appended claims and the several views illustrated in the accompanying drawings:

In the drawings:

FIGURE 1 is a perspective view of a fender protectively wrapped in accordance with the invention with the fender being shown in an upright position, other fenders being shown in nested relation to the fender in phantom lines.

FIGURE 2 is another perspective view of the wrapped fender of FIGURE 1 with the view being directed towards the surface of the fender covered by the protective covering and shows further the details of the fender package.

FIGURE 3 is an enlarged elevational view of the protectively wrapped fender of FIGURES 1 and 2 as viewed from what would be the lower edge of the fender when assembled as part of a car and shows more specifically the relationship of the protective covering with respect to the fender.

FIGURE 4 is an enlarged horizontal sectional view taken along the line 4—4 of FIGURE 1 and shows further the details of the protectively wrapped fender, other fenders nested together with the fender being shown in phantom lines.

FIGURE 5 is a fragmentary perspective view showing the manner in which the protective covering is secured to a mounting flange of the fender by means of a spring type fastener passed first through the protective covering and then through a bolt hole in the mounting flange of the fender.

FIGURE 6 is an enlarged fragmentary vertical sectional view taken along the line 6—6 of FIGURE 5 and shows more clearly the details of the securing clip.

FIGURE 7 is a perspective view similar to FIGURE 5 and shows the use of a modified form of clip.

FIGURE 8 is an enlarged fragmentary horizontal sectional view taken along the line 8—8 of FIGURE 7 and shows the specific details of the retaining clip of FIGURE 7 and the relationship thereof with respect to the fender.

FIGURE 9 is a plan view of the protective covering prior to the mounting thereof on a fender.

FIGURE 10 is a perspective view on a reduced scale showing the present conventional form of protectively wrapping a fender, the fender being shown relative to another fender which is illustrated by means of phantom lines to clearly show that the fenders must be shown in side-by-side relation since internesting thereof is impossible.

Referring now to the drawings in detail, reference is first made to the prior art showing in FIGURE 10. At the present time conventional automobile fenders, such as the fender 11 of FIGURE 10 is wrapped for shipment by extending around the exposed surface, the ends and edges thereof a protective covering 12 which is normally in the form of a soft paper product as opposed to a paperboard. The protective covering, after being wrapped about the fender, is secured in place by means of a plurality of encircling straps 13, 14 and 15, which are of a conventional type. It will be readily apparent from FIGURE 10 that due to the need for the use of encircling straps 13, 14 and 15, the two wrapped fenders 11 cannot be nested and therefore each fender requires a relatively large amount of space. Although the fenders are hollow and light, it will thus be apparent that the nesting of the fenders is prevented.

Reference is now made to FIGURE 1 wherein the same fender 11 is illustrated as being part of a package with the fender 11 being supported by a protective covering, generally referred to by the numeral 16. It is to be noted that the protective covering 16 extends substantially only about that portion of the fender which is to be protected, and is secured to the fender by a plurality of clips 17 which are engaged with edge portions of the fender 11 and therefore need not pass around the fender as do the straps 13, 14 and 15. Accordingly, a plurality of the fenders 11 wrapped in accordance with this invention and utilizing the protective covering 16 may be nested, as is shown in FIGURE 1, for shipment occupying a minimum of space whereby a very large number of the wrapped fenders 11 shown in FIGURE 1 may be shipped or stored in a relatively small space as compared to that required in accordance with the previous manner of protectively wrapping fenders.

Reference is now made to FIGURE 9 wherein the specific details of the protective covering 16 are shown. It is to be understood that prior to the installation of the protective covering 16 on the fender 11, the protective covering 16 is generally in the form of a blank although it is completely ready for attachment to the fender 11. The fender covering 16 is preferably formed of a paperboard and normally is formed of corrugated board with the corrugations extending transversely of the length of the fender covering 16. The protective covering 16 includes a main portion 19 which corresponds generally to the developed outline of the surface of the fender to be protected with the main portion 19 being generally set off by fold lines 20, 21 and 22. The main portion 19 of the protective covering 16 is further provided with longitudinally extending fold lines 23, 24, 25 and 26 to effect the bending of the main portion 19 out of a single plane so that the main portion 19 of the protective covering 16 may conform to the cross section of the fender to be protected thereby.

It is to be understood that the protective covering 16 is particularly adapted for use with a particular make and year of automobile fender. The example protective covering 16 illustrated in FIGURE 9 is for a 1960 Chevrolet front fender.

The fold line 20 sets off at one edge of the protective covering 16 and edge portion or flap 27 which may be interrupted at longitudinally spaced intervals by slits 28 to facilitate the securement of the edge portion 27 to an arcuate surface.

The fold line 21 sets off a relatively short forward and lower edge portion 29 having an intermediate, longitudinally extending fold line 30 to facilitate the bending of the edge portion 29 about a mounting flange of the fender.

The fold line 22 sets off a lower rearward edge portion 31 having an intermediate longitudinal fold line 32 which permits the folding of the edge portion 30 for wrapping about a lower rear edge portion of the fender 11.

A securing flap 33 is carried by an upwardly and inwardly sloping diagonal edge portion 45 of the protective covering 16, which edge portion corresponds generally to the outline of the rear part of the wheel well defined in part by the fender 11. The flap 33 projects away from the main portion 19 of the protective covering 16 and is set thereby by the provision of a pair of slits 34. The flap 33 is hingedly connected to the main portion of the protective covering 19 along a fold line 35 which is offset inwardly of the edge of the protective covering 16 and which flap is separated from the remainder of the protective covering 16 by the cut lines or slits 34. The flap 33 is provided with a fold line 36 which extends longitudinally of the flap 33 to facilitate the bending of the flap 33 around an adjacent flange portion of the fender 11.

It is to be noted that when the fender covering 16 is mounted on the fender 11, due to the greater length of the fender covering 16 as compared to the fender 11, the fender covering 16 projects at least beyond one end of the fender and preferably beyond both ends of the fender both for the purpose of protecting the ends of the fender and facilitating storage and shipment of the fender in the manner to be described in detail hereinafter. It is to be noted that the ends of the protecting cover 16 are square cut. This is desired for two reasons, one which aids in the supporting of a fender on end for storage or shipment, and the other to utilize a minimum amount of paperboard in the forming of the protective fender covering 16.

When it is desired to protect a fender, such as the fender 11 for storage and shipment, the protective covering 16 is wrapped around utilizing the fold lines 23, 24, 25 and 26 to generally conform the main portion 19 of the protective covering 16 to the outline of the outer surface of the fender 11. It is to be noted that the protective covering 16 will be positioned on the fender 11 longitudinally of the fender by means of the flap 33 in the manner best illustrated in FIGURE 1. The flap 33 is first secured to a flange portion 37 of the fender by means of one of the clips 17. The edge portions 27, 29 and 31 are then folded around the edges of the fender 11 in the manner generally illustrated in FIGURES 1 and 3 and additional ones of the clips 17 are passed through the protective covering 16 and through suitable mounting bolt holes in flanges of the fender 11.

Reference is now made to FIGURES 5 and 6 wherein the general details of securing a portion of the protective covering 16 to the fender 11 are shown. A mounting flange 38 of the fender 11 is provided with a customary bolt hole 39 through which a bolt is passed in the securing of the fender 11 to the remainder of the automobile body. The edge portion 27 of the protective covering 16 overlies the mounting flange 38 and projects outwardly thereof. The clip 17 is forced through the edge portion 27 and then through the bolt hole 39 of the mounting flange 38 with the clip 17 being of the spring type so as to be automatically lockable in place once it has passed through the mounting flange 38. At this time it is pointed out that the clip 17 is only one of numerous conventional clips which may be used in the securement of the protective covering 16 to the fender 11. It is also pointed out at this time that it is preferred that the clip utilized for fastening the protective covering 16 be of the type which may be passed through the protective covering 16 without the presence of any openings whatsoever therein in order to avoid alignment problems. However, it is feasible to utilize clip type fasteners which will require either the punching of holes in the edge portions of the protective covering 16 or the formation of slits therein to permit the passage of the clips.

It is to be noted that when the edge portion 27 is secured to the associated mounting flange 38 of the fender 11, there is a slight separation of the portions thereof due to the curvature of the flange 38. This is best illustrated in FIGURE 3. It is to be understood that the slits 28 will be spaced in accordance with the necessary division of the edge portion 27 as required by the curvature of the mounting flange 38 and should the mounting flange 38 be straight, then no slits 28 would be necessary.

Attention is also directed to the fact that when the protective covering 16 is secured to the fender 11, it projects beyond both ends thereof. In this manner, the opposite ends of the fender 11 are well protected by the protective covering 16. In addition, because at least one end of the protective covering 16 is square cut and due to the cross section of the fender 11, the protective covering 16 may additionally serve as a support for setting the fender 11 in an upstanding position as is clearly shown in FIGURES 1 and 3. By being able to stand the packaged fenders on ends, and in nested relation, it will be readily apparent that the shipment and storage of the packaged fenders is greatly facilitated.

Reference is now made to FIGURES 7 and 8 wherein a modified form of clip is illustrated, the clip being referred to by the numeral 40. The clip 40 is generally of the hairpin or C-shape type and is a spring clip. It is to be noted that in the specific connection illustrated in FIGURES 7 and 8, the clip is slid over the free edges of the mounting flange 38 and the edge portion 27 with legs 41 and 42 of the clip 40 tightly clamping together the mounting flange 38 and the edge portion 27. It is to be noted that the clip 41 is provided with transverse projections 43 which are pressed into the outer surface of the edge portion 27. In addition, the leg 42 is provided with a hook portion 44 which will engage in the bolt hole 39 so as to lock the clip 40 to the mounting flange 38.

Although one form of C-shape or horse-shoe type clip has been illustrated, it is to be understood that the invention is not so limited to such a clip. In the first place, it is not necessary that the leg of the clip which engages the mounting flange 38 be provided with a hook portion, such as the hook portion 44 for engagement in a bolt hole in that when a clip of the U-shape type is utilized, it is not necessary that the clip be interlocked within a bolt hole although such a connection provides for assurance against accidental removal of the clip. Also, it is not necessary that the leg of the clip which engages the protective covering 16 be transversely serrated or otherwise provided with means for digging into and interlocking with the material of the protective covering although this feature is also desirable in retaining the clip in place.

It will be understood that the outline of the protective covering 16 will vary in accordance with a particular outline of the fender which is to be protectively wrapped. It is also to be understood that while the primary use of a protective covering in accordance with this invention is in conjunction with automobile fenders, the invention is not so limited. For example, the protective covering and the means for securing the protective covering in place may be utilized in conjunction with hoods of an automobile, trunk desks and components for other pieces of machinery and equipment besides automobiles wherein the components are of a light weight sheet material construction, for example, housings for air conditioners, etc.

Although in the preferred embodiment of the invention the corrugations run transversely of the blank, as has been clearly pointed out above, when the fenders are to be stood on end in shipment and during storage, as opposed to lying horizontally in nested relation, the corrugations may extend longitudinally of the length of the blank. With the longitudinal corrugation arrangement the fender cover will have a greater stiffness longitudinally thereof and thus provide a better support for the covered fender when the covered fender is stood on end and with the fender spaced above the supporting surface.

From the foregoing, it will be readily apparent that there has been provided a highly desirable, yet simple and inexpensive, protective covering for protecting during shipment and storage surfaces of light weight sheet material components. Although a preferred embodiment of the invention has been described and illustrated herein, it is to be understood that the invention is not so restricted, and minor modifications may be made within the spirit and scope of the invention, as defined by the appended claims.

What is claimed as new:

1. A plurality of automobile fenders disposed in nested upright relation for storage and shipment, and each of said fenders having a removable protective sheet covering folded about the outer surface thereof and a bottom end of each of said fenders projecting beyond and substantially normal to the axes of the fenders whereby the coverings function as supports for maintaining the fenders in the upright positions thereof irrespective of the developed outline of the fenders.

2. The automobile fenders of claim 1 wherein said protective covering is formed of paperboard.

3. The automobile fenders of claim 1 wherein said protective covering is formed of corrugated board.

4. In combination with a fender, a protective paperboard sheet covering overlying and folded around the outer surfaces of said fender, and fasteners, said fasteners being directly engaged with said fender releasably securing said covering to said fender.

5. In combination with a fender, a protective paperboard sheet covering overlying and folded around the outer surfaces of said fender, and fasteners, said fasteners being directly engaged with said fender releasably securing said covering to said fender, said fasteners being in the form of clips passing through said covering and the customary bolt openings in said fender.

6. In combination with a fender, a protective covering overlying the outer surface of said fender, and fasteners, said fasteners being directly engaged with said fender releasably securing said covering to said fender, said fasteners being in the form of clips passing through said covering and customary bolt openings in said fender.

7. In combination with a fender, a paperboard sheet protective covering overlying the outer surface of said fender, said covering having a main portion conforming generally to the developed outline of said fender and edge portions defining flaps folded around edges of said fender, and fasteners passing through said flaps and being releasably secured to said fender to secure said covering to said fender.

8. In combination with a fender, a paperboard sheet protective covering overlying the outer surface of said fender, said covering having a main portion conforming generally to the developed outline of said fender and edge portions defining flaps folded around edges of said fender, and fasteners passing through said flaps and being releasably secured to said fender to secure said covering to said fender, said paperboard covering being formed of corrugated board with the corrugations thereof extending transversely of and around said fender.

9. In combination with a fender, a paperboard protective covering overlying the outer surface of said fender, said covering having a main portion conforming generally to the developed outline of said fender and edge portions defining flaps folded around edges of said fender, and fasteners passing through said flaps and being releasably secured to said fender to secure said covering to said fender, said fasteners being in the form of clips passing through said covering and customary bolt openings in said fender.

10. In combination with a fender, a paperboard sheet protective covering overlying the outer surface of said fender, said covering having a main portion conforming generally to the developed outline of said fender and edge portions defining flaps folded around edges of said fender, and fasteners passing through said flaps and being releasably secured to said fender to secure said covering to said fender, said fasteners being in the form of clips having parallel legs clamping portions of said flaps and said fender therebetween.

11. In combination with a fender, a paperboard protective covering overlying the outer surface of said fender, said covering having a main portion conforming generally to the developed outline of said fender and edge portions defining flaps wrapped around edges of said fender, and fasteners passing through said flaps and being releasably secured to said fender to secure said covering to said fender, said protective covering projecting beyond at least one end of said fender and having an end disposed substantially normal to the axis of said fender whereby said covering may function as a support for standing the covered fender on end.

12. A plurality of automobile fenders disposed in nested relation for storage and shipment, and each of said fenders having a removable protective covering about the outer surface thereof, each of said protective coverings projecting beyond at least one end of an associated fender and having an end disposed substantially normal to the axes of the fenders, said fenders being disposed in vertical positions and supported by the said ends of the protective coverings thereof.

13. In combination with a light weight sheet formed component of the type having a surface to be protected, a paperboard protective covering overlying said surface, said component having bolt holes for receiving securing bolts in the use of said component, and clips carried by said covering and engaged in said bolt holes and releasably retaining said covering on said component.

14. In combination with a fender, a paperboard protective covering overlying the outer surface of said fender, said covering having a main portion conforming generally to the developed outline of said fender and edge portions defining flaps wrapped around edges of said fender, and fasteners passing through said flaps and being releasably secured to said fender to secure said covering to said fender, said paperboard covering being formed of corrugated board with the corrugations thereof extending longitudinally of said fender so as to provide for stiffness of the covering longitudinally of the fender whereby the covered fender may be stood on end with the fender supported by said covering.

15. A protective cover for use with a fender for protecting the fender during shipment, said cover being formed of corrugated paperboard and having a main portion conforming generally to a U-shaped configuration corresponding to the developed outline of an automobile fender to be covered, said U-shaped main portion including a longitudinally extending bight portion and spaced transverse leg portions, edge portions connected to said bight and leg portions along hinge lines to define securing flaps adapted to be wrapped around edges of a fender, said main portion having longitudinal fold lines for facilitating the shaping of said cover around a fender to conform generally to the contour thereof, and at least one of the leg portions including a square cut transverse edge to facilitate the standing of the cover on end after the same has been wrapped about and secured to a fender.

16. The protective cover as defined in claim 15 wherein the corrugations of the paperboard extend transversely of said longitudinally extending bight portion.

17. A protective cover for use with a fender for protecting the fender during shipment, said cover being formed of corrugated paperboard and having a main portion conforming generally to a U-shaped configuration corresponding to the developed outline of an automobile fender to be covered, said U-shaped main portion including a longitudinally extending bight portion and spaced transverse leg portions, edge portions connected to said bight and leg portions along hinge lines to define securing flaps adapted to be wrapped around edges of a fender, the securing flaps along said bight portion being defined by at least one transverse score line whereby the securing flaps can be individually folded during the wrapping thereof around the edges of a fender, and at least one flap projecting into an area defined by said bight and leg portions, said main portion having longitudinal fold lines for facilitating the shaping of said cover around a fender to conform generally to the contour thereof, said corrugated paperboard having corrugations extending transversely of said main portion, and at least one of the bight portions including a square cut transverse terminal edge to facilitate the standing of the cover on end upon the securement thereof to a fender.

References Cited by the Examiner

UNITED STATES PATENTS

| | | | |
|---|---|---|---|
| 668,048 | 2/1901 | McCarthy | 206—65 |
| 1,491,269 | 4/1924 | Joplin | 53—32 |
| 1,562,196 | 11/1925 | Abrams | 206—46 |
| 1,869,584 | 8/1932 | Raymond | 53—32 |
| 2,248,736 | 7/1941 | Bauer | 206—65 |
| 2,459,879 | 1/1949 | Hardwick | 206—46 |
| 2,539,514 | 1/1951 | Jenett | 206—65 |
| 2,551,374 | 5/1951 | Hansen. | |
| 2,807,356 | 9/1957 | Blum | 206—46 |
| 2,896,833 | 7/1959 | Markham | 206—62 X |
| 2,917,166 | 12/1959 | Lidgard | 229—40 |
| 2,973,091 | 2/1961 | Berry | 229—40 |
| 3,050,232 | 8/1962 | Sutherland | 229—40 |

FOREIGN PATENTS 181,811 4/1955 Austria.

THERON E. CONDON, *Primary Examiner.*

EARLE J. DRUMMOND, *Examiner.*